United States Patent [19]

Libus et al.

[11] 4,269,676

[45] May 26, 1981

[54] METHOD OF WINNING COPPER AND ACCOMPANYING METALS FROM SULFIDIC ORES, POST-FLOTATION DEPOSITS AND WASTE PRODUCTS IN THE PYROMETALLURGICAL PROCESSING OF COPPER ORES

[75] Inventors: Włodzimierz Libuś, Gdańsk; Marek Kluczkowski, Gdańsk-Oliwa; Michał Pilarczyk; Henryk Strzelecki, both of Gdańsk; Roman Pastewski; Wacław Grzybkowski, both of Gdańsk-Oliwa, all of Poland

[73] Assignee: Politechnika Gdanska, Gdańsk-Wrzeszcz, Poland

[21] Appl. No.: 54,368

[22] Filed: Jul. 3, 1979

[30] Foreign Application Priority Data

Jul. 26, 1978 [PL] Poland .................................. 208670

[51] Int. Cl.³ .......................... C25C 1/12; C22B 3/00; C22B 15/00; C01G 3/04
[52] U.S. Cl. ..................................... 204/107; 75/114; 75/117; 423/28; 423/38
[58] Field of Search ................... 204/105 R, 106, 107, 204/108; 75/114, 117; 423/24, 27, 28, 38

[56] References Cited

U.S. PATENT DOCUMENTS

| | | | |
|---|---|---|---|
| 3,197,274 | 7/1965 | White | 75/117 |
| 3,284,501 | 11/1966 | Swanson | 75/117 |
| 3,558,288 | 1/1971 | Burrows | 75/117 |
| 4,098,867 | 7/1978 | Grinstead | 423/24 |

OTHER PUBLICATIONS

J. Inorg. Nucl. Chem., 1969, vol. 31, pp. 513–525.

Primary Examiner—T. M. Tufariello
Attorney, Agent, or Firm—Ladas & Parry

[57] ABSTRACT

The invention relates to a method of winning copper and accompanying metals from sulfidic ores, post-flotation deposits and waste products in the pyrometallurgical processing of copper ores.

In accordance with the present invention, transferring of insoluble minerals of the metals into solution consists in leaching the above materials, initially ground to below 0.1 mm particle size, by means of a mixture of a heterocyclic aromatic amine, selected from the group consisting of pyridine, $\alpha$-picoline, $\beta$-picoline, $\gamma$-picoline and 2,6-lutidine with a chlorinated methane derivative selected from the group consisting of methyl chloride, methylene dichloride, chloroform and carbon tetrachloride. The liquid phase being separated from the solid residue, the metal compounds are separated from the solution and depositing by known methods, e.g. by electrodeposition. The leaching process is preferably performed at the boiling temperature of the solvent mixture, the solvents being recycled to the process, preferably after purification by known methods.

8 Claims, No Drawings

METHOD OF WINNING COPPER AND ACCOMPANYING METALS FROM SULFIDIC ORES, POST-FLOTATION DEPOSITS AND WASTE PRODUCTS IN THE PYROMETALLURGICAL PROCESSING OF COPPER ORES

BACKGROUND OF THE INVENTION

This invention relates to a method of winning copper accompanying metals from sulfidic ores, post-flotation deposits, and waste products in the pyrometallurgical processing of copper ores.

Conventional methods of winning copper and accompanying metals from sulfidic ores and post-flotation deposits consist in leaching materials containing insoluble metal compounds, followed by further treatment to obtain desired metals, usually by electrodeposition, cementation, or reduction by means of hydrogen gas.

The known leaching liquors include acidic substances such as sulphuric, nitric or hydrofluoric acids, salts of strong acids, alkaline substances such as hydroxides, or carbonates, complex forming agents among which used are cyanides, ammonia (Polish Pat. No. 51794), as well as numerous organic complexing agents, usually in aqueous solution, such as versenic acid (Polish Pat. No. 79872), aliphatic amines, carboxylic acids, and nitriles.

A frequent disadvantage of the above methods is the necessity of a preliminary treatment of the ore, or of conducting of the leaching process, at elevated temperatures, resulting in increased energy expenditure. Irreversible reactions of some leaching agents result in their increased consumption. In adition, the variety of minerals in the ore offers difficulties in a proper selection of the leaching agent, ensuring high degree of recovery of the metal. Most of the leaching liquors used are highly corrosive, resulting in serious difficulties in construction and technology. Acidic leaching is accompanied by toxic gas emission, in particular of sulphur dioxine, and nitrogen oxides, producing technological complications resulting from the necessity of utilization of these gases. In addition, an increased consumption of the leaching agent in accompanying reactions results in the latter case. For example, most of the acid used in leaching rocky materials containing calcium and magnesium carbonates is consumed in decomposition of the barren rock. Similar losses occur in metal winning from the silicates containing ores using alkaline leaching liquors able to dissolve silica. The cyanide methods frquently used in hydrometallurgy, particularly in leaching copper compounds, creates serious biological threats, necessitating complicated technologies using closed systems.

SUMMARY OF THE INVENTION

In accordance with the present invention, recovery of copper and accompanying metals from sulfidic ores, post-flotation deposits, or waste products in the pyrometallurgical process, consists in leaching the materials, initially ground to a suitable particle size preferably below 0.1 mm, by means of a solvent mixture containing a heterocyclic amine selected from the group consisting of pyridine, α-picoline, β-picoline, γ-picoline and 2,6-lutidine and a chlorinated methane derivative selected from the group consisting of methyl chloride, methylene dichloride, chloroform and carbon tetrachloride, preferably at the boiling temperature of the leaching liquor, followed in succession by separating the organic solution from the solid residue, separating the metal compounds from the solution, and depositing metals from the compounds by known methods, e.g. electrolytically, while the solvents are recycled to the process, preferably after being purified by known methods. Post-flotation deposits are used in the form of sandy slimes and loamy slimes. As waste products from the pyrometallurgical process used are shaft dusts from electrofiltration.

The leachihg liquor preferably contains from 5 to 90 volume percent of the chlorinated methane derivative, preferably chloroform.

As the heterocyclic amine is used pyridine, α, β, γ-, -picoline, or 2,6-lutidine.

The metal compounds are separated from the organic phase by extraction to the aqueous phase and/or solvent evaporation.

Our investigations have shown that a leaching liquor consisting of a heterocyclic amine and a chlorinated methane derivative owes is exceptional leaching properties to the H ··· type hydrogen bond formation between the chlorinated methane derivatives and the coordinated amine molecules of the solution complex. This interaction, enhancing the $d_\pi$-electron back donation from the central metal atom to the amine molecules at the same time enhances complex forming ability of the latter towards transition metal cations. The leaching effect thus achieved could not be expected earlier as the above synergetic effect has only been discovered now, and because neither component has the leaching properties used separately. It is only the combined action of both components of the mixture, viz. of the heterocyclic amine and the protic halogenated hydrocarbon, that results in a good leaching.

Our invented leaching method does not require preliminary enrichment of the ore, or of the other metal containing materials, permitting effective dissolution of otherwise insoluble minerals already at room temperature without their preliminary treatment such as roasting, action of acids, or of other reagents under elevated temperature or pressure. As a result, recovery of valuable metals becomes possible at any stage of the metallurgical process. Moreover, owing to the mild chemical nature of the leaching liquor and lacking ionization, excessive corrosion of the installations will be eliminated. Also, ready regeneration of the solvents permits processing in a closed system. As a result, the leaching process should be economically attractive.

Winning of copper and acompanying metals in accordance with the invention is illustrated by the following examples.

EXAMPLE I 5 kg of the sulfidic copper ore containing 2.28% of copper, 1.34% of iron, 1.1% of sulphur, 0.026% of silver, 0.017% of cobalt, 0.012% of nickel, 0.0044% of molybdenum, and 0.19% of vanadium, is ground to obtain particle size of the order of 0.08 mm, followed by adding 25 dm$^3$ 1:1 by volume mixture of pyridine and chloroform. The suspension is mixed for 6 hours at 20° C. The pyridine-chloro-complexes of copper and of the accompanying metals extracted to the solution are separated from the solid residue by filtration. The residue is washed with 5 dm$^3$ of water, further used to extract the copper compounds from the organic phase. The extraction process is repeated three times using, totally, 15 dm$^3$ of water. The aqueous phase obtained contains, in addition to the metal compounds, some amount of pyridine, which is re-extracted in two steps to the organic phase using 5 dm$^3$ of chloroform in each step. After being acidified by means of 0.1 dm$^3$ of sulphuric acid of 1.84 density the aqueous solution is electrolized using insoluble anodes of a lead+antimony alloy. Electrolitic copper sheets are used as cathodes. The process is conducted at 160 A/m$^2$ cathodic current density at 32° C. As a result 86 g of copper is obtained, constituting 95.5% of the total copper content in the ore.

EXAMPLE II 10 kg of crumbled sandy slimes containing 0.2% of copper representing a fine copper content of 20 g, and water content not exceeding 50%, is added with 50 dm$^3$ of a 20:80 by volume mixturs of pyridine and chloroform. The mixture is heated to the boiling temperature of approx. 72° C., further maintained for 60 min, followed by cooling to ambient temperature and separating the solid residue by filtration. The separated solid residue is washed using 10 dm$^3$ of water, further used in extracting the copper compounds from the organic phase. The extraction is acomplished in three steps using, totally, 15 dm$^3$ of water. In turn, pyridine is reextracted from the water phase in two steps using 10 dm$^3$ of chloroform, the remaining solution is acidified adding 0.1 dm$^3$ of sulphuric acid of density 1.84, and finally electrolyzed as in the example I. 18.4 g of copper is obtained, constituting 92% of the original copper content in the slime. The organic phase remaining after extraction and reextraction are accomplished is distilled and recycled to the process.

EXAMPLE III 0.5 kg of the sulfidic ore containing 1.82% of copper, in addition to the other metals, after being ground to the particle size of the order of 0.1 mm, is leached using 2.5 dm$^3$ of the 40:60 by volume γ-picoline+chloroform mixture. The process is conducted during 6 hours at 20° C., followed by fitering off the solid residue. The latter is washed with a 0.5 dm$^3$ portion of water, further used in extracting the metal compounds from the organic phase, 1.5 dm$^3$ of water being used for the latter purpose. After reextraction of γ-picoline by chloroform is accomplished using 0.5 dm$^3$ of the latter, the solution is acidified by means of sulphuric acid of density 1.84, and electrolized as in the example I. 8.05 g of copper is obtained constituting 88.5% of the total copper content in the ore.

We claim:

1. A method of winning copper and accompanying metals from a copper-containing material selected from the group consisting of sulfidic ores or their concentrates, post-flotation deposits and waste products from pyrometallurgical processing of copper ores, which comprises grinding the material to a particle size below 0.1 mm., leaching the resulting comminuted material with a solvent system comprising a mixture of a heterocyclic aromatic amine selected from the group consisting of pyridine, α-picoline, β-picoline, γ-picoline and 2,6-lutidine, with a chlorinated methane derivative selected from the group consisting of methyl chloride, methylene dichloride, chloroform and carbon tetrachloride, whereby insoluble values of the metals are dissolved in the resulting solution due to the formation of a soluble metal-chloro- amine complex, filtering the solid residue from the resulting solution and separating the metal compounds from the organic phase, and recovering the metals by electrowinning.

2. A method according to claim 1, wherein the copper-containing material is a post-flotation deposit in the form of a sandy slime or loamy slime.

3. A method according to claim 1, wherein the copper-containing material comprises waste products from pyrometallurgical processing of copper ores in the form of shaft dust from electrofiltration.

4. A method according to claim 1, wherein the solvent system contains 5% to 90% by volume of the chlorinated methane derivative.

5. The method as set forth in claim 1 wherein the metal compounds are separated from the organic phase by means of water extraction and/or distillation.

6. A method according to claim 4, wherein the chlorinated methane derivative is chloroform.

7. A method according to claim 1, wherein the leaching is conducted at the boiling temperature of the solvents.

8. A method according to claim 1, wherein, after separation of the metal compounds, the solvents are purified by known methods and recycled to the solvent system.

* * * * *